(12) United States Patent
Huang et al.

(10) Patent No.: US 6,773,239 B2
(45) Date of Patent: Aug. 10, 2004

(54) FAN WITH IMPROVED SELF-COOLING CAPABILITY

(75) Inventors: Wen-Shi Huang, Taoyuan Sien (TW); Kuo-Cheng Lin, Taoyuan Sien (TW); Shun-Chen Chang, Taoyuan Sien (TW); Wen-Hao Liu, Taoyuan Sien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/102,251

(22) Filed: Mar. 20, 2002

(65) Prior Publication Data

US 2002/0141866 A1 Oct. 3, 2002

(30) Foreign Application Priority Data

Mar. 27, 2001 (TW) ........................................ 90204600 U

(51) Int. Cl.[7] .............................................. F04B 35/04
(52) U.S. Cl. ........................ 417/354; 310/62; 417/423.8
(58) Field of Search ..................... 310/61, 62; 417/354, 417/423.1, 423.8, 424.1

(56) References Cited

U.S. PATENT DOCUMENTS

| | | | | |
|---|---|---|---|---|
| 4,955,791 A | * | 9/1990 | Wrobel | 417/354 |
| 6,379,126 B1 | * | 4/2002 | Konno | 417/423.1 |
| 6,384,494 B1 | * | 5/2002 | Avidano et al. | 310/62 |
| 6,394,768 B1 | * | 5/2002 | Fukuda et al. | 417/354 |
| 6,461,124 B1 | * | 10/2002 | Morelli | 417/423.8 |
| 6,488,483 B1 | * | 12/2002 | Hsieh | 417/354 |

* cited by examiner

Primary Examiner—Michael Koczo
(74) Attorney, Agent, or Firm—Thomas, Kayden, Horstemeyer & Risley

(57) ABSTRACT

A fan with improved self-cooling capability having a frame, a stator, a magnetic ring, an iron case, and a rotor blade impeller. The frame has a base for containing the stator, and the stator is provided with at least a coil. The magnetic ring is magnetically coupled to the stator, and the iron case is coupled to the magnetic ring while being provided with at least a first heat dissipation hole. The rotor blade impeller is formed on the iron case, in which at least a second heat dissipation hole aligned to the first heat dissipation hole is formed on a hub of the rotor blade impeller, and the first heat dissipation hole and the second heat dissipation hole are not formed to directly align to a position of the coil.

14 Claims, 7 Drawing Sheets

United States Patent US 6,773,239 B2

FAN WITH IMPROVED SELF-COOLING CAPABILITY

BACKGROUND OF THE INVENTION

1. Field of the Invention

The present invention relates to a fan, and particularly to a fan with improved self-cooling capability.

2. Description of the Related Art

In a conventional fan, heat is generated by the internal components of the fan, such as the coils, in operation. Self-cooling heat dissipation is necessary to prevent the fan from overheating or being damaged due to the cumulative operation heat. However, the conventional fan self-cooling heat dissipation has drawbacks, as described hereafter.

FIG. 1(a), FIG. 1(b), FIG. 1(d), FIG. 1(e) and FIG. 1(c) illustrate an example of a conventional fan. FIG. 1(a) and FIG. 1(d) shows the exploded view, FIG. 1(b) and FIG. 1(e) shows the cross-sectional view, and FIG. 1(c) shows the top view of the conventional fan. The conventional fan has a frame 10, a stator 20, a magnetic ring 30, an iron case 50 and a rotor blade impeller 60.

The frame 10 has a base 11 in which the stator 20 is formed. The stator 20 has a plurality of coils 21 as shown in FIG. 1(b). The magnetic ring 30 is positioned around the stator 20. A cup-shaped iron case 50 is coupled to the magnetic ring 30, and the iron case 50 is provided with several heat dissipation holes 51 and several engaging holes 52 as shown in the enlarged illustration of FIG. 1(d). The heat dissipation holes 51 provided on the upper surface of the iron case 50 are positioned above the coils 21, and the engaging holes 52 are provided around the periphery of the heat dissipation holes 51. Further, the rotor blade impeller 60 is connected to the iron case 50, and an opening 65 is provided on the hub 61 of the rotor blade impeller 60 in order to expose the heat dissipation holes 51 to the environment.

Since the heat dissipation holes 51 are positioned above the coils 21 in the conventional fan, the coils 21 are exposed to the environment, as shown in the top view of FIG. 1(c). Thus, foreign matter such as dust or particles may directly fall onto the coils 21, diminishing the fan's performance.

SUMMARY OF THE INVENTION

Thus, the present invention discloses a fan with improved self-cooling capability, in which foreign matter does not directly fall onto the coils of the fan.

The present invention discloses a fan with improved self-cooling capability including a frame, a stator, a magnetic ring, an iron case, and a rotor blade impeller. The frame is provided with a base and selectively formed with a plurality of guard blades. The stator is disposed on the base and provided with a plurality of coils and other components, such as a circuit board and electric components mounted on the circuit board, e.g. a driving IC and a Hall component.

The magnetic ring is magnetically coupled to the stator, which means the magnetic ring may be disposed substantially around the stator. The iron case is coupled to the magnetic ring and provided with at least a first heat dissipation hole. The rotor blade impeller has a hub, in which, in a first embodiment, at least a second heat dissipation hole aligned to the first heat dissipation hole is formed on the hub. In a second embodiment, an opening is formed on the hub and at least a heat dissipation notch aligned to the first heat dissipation hole is provided around the opening.

The rotor blade impeller is coupled to the iron case, in which the rotor blade impeller may be provided with at least an extrusion in order to couple to a part of the first heat dissipation hole of the iron case. In this case, it should be noted that the number of the first heat dissipation holes is greater than the number of extrusions.

In the present invention, the first heat dissipation hole and the second heat dissipation hole (or the heat dissipation notch) are not formed to directly alien to a position of the coils. For example, the first heat dissipation hole and the second heat dissipation hole can be formed above the magnetic ring; that is, the first heat dissipation hole and the second heat dissipation hole are not formed directly above the end of the coils. In this case, no part of the coils is directly exposed in the top view of the fan assembly, so that foreign matter does not directly fall onto the coils of the fan.

Further, the first heat dissipation hole and the second heat dissipation hole (or the heat dissipation notch) provide a heat exchange route to the outer environment, which provides for the desired self-cooling capability of the device by dissipating heat generated by the coils and other internal components. Thus, the fan of the present invention may be operated at a higher rotational speed and have a lengthened operation time.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figures 1A, 1D:
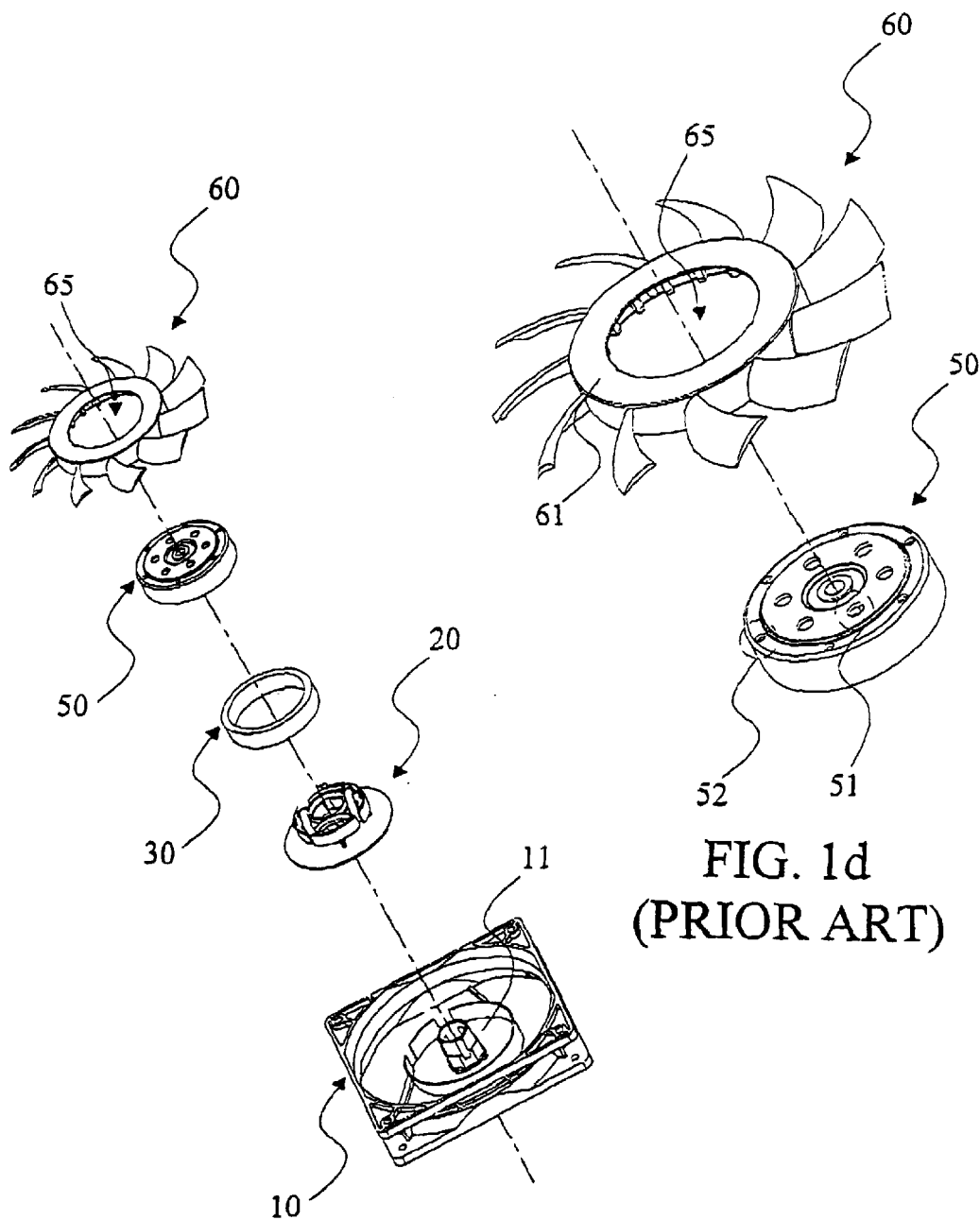
FIG. 1(a) is an exploded view of the conventional fan.
FIG. 1(d) is an enlarged view of the iron case 50 and the rotor blade impeller 60 in FIG. 1(a)
Figure 1E:
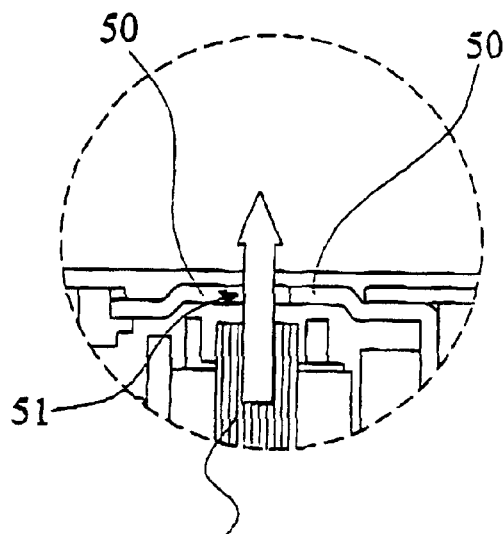
FIG. 1(e) is an enlarged view showing a portion of FIG. 1(b)
Figure 1B:
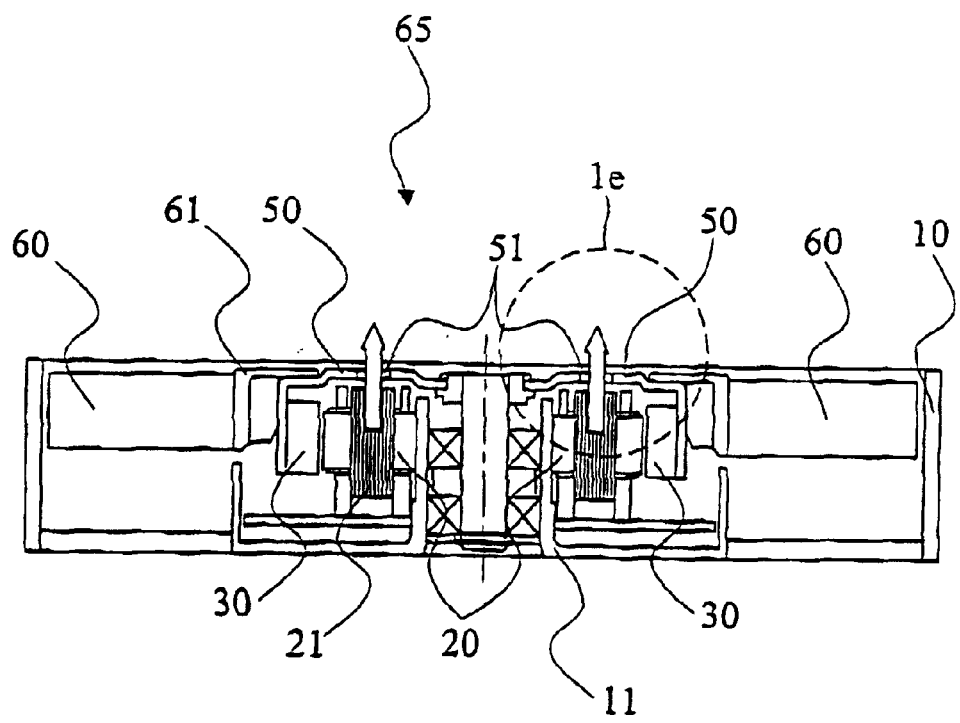
FIG. 1(b) is a cross-sectional view of the conventional fan in FIG. 1(a)
Figure 1C:
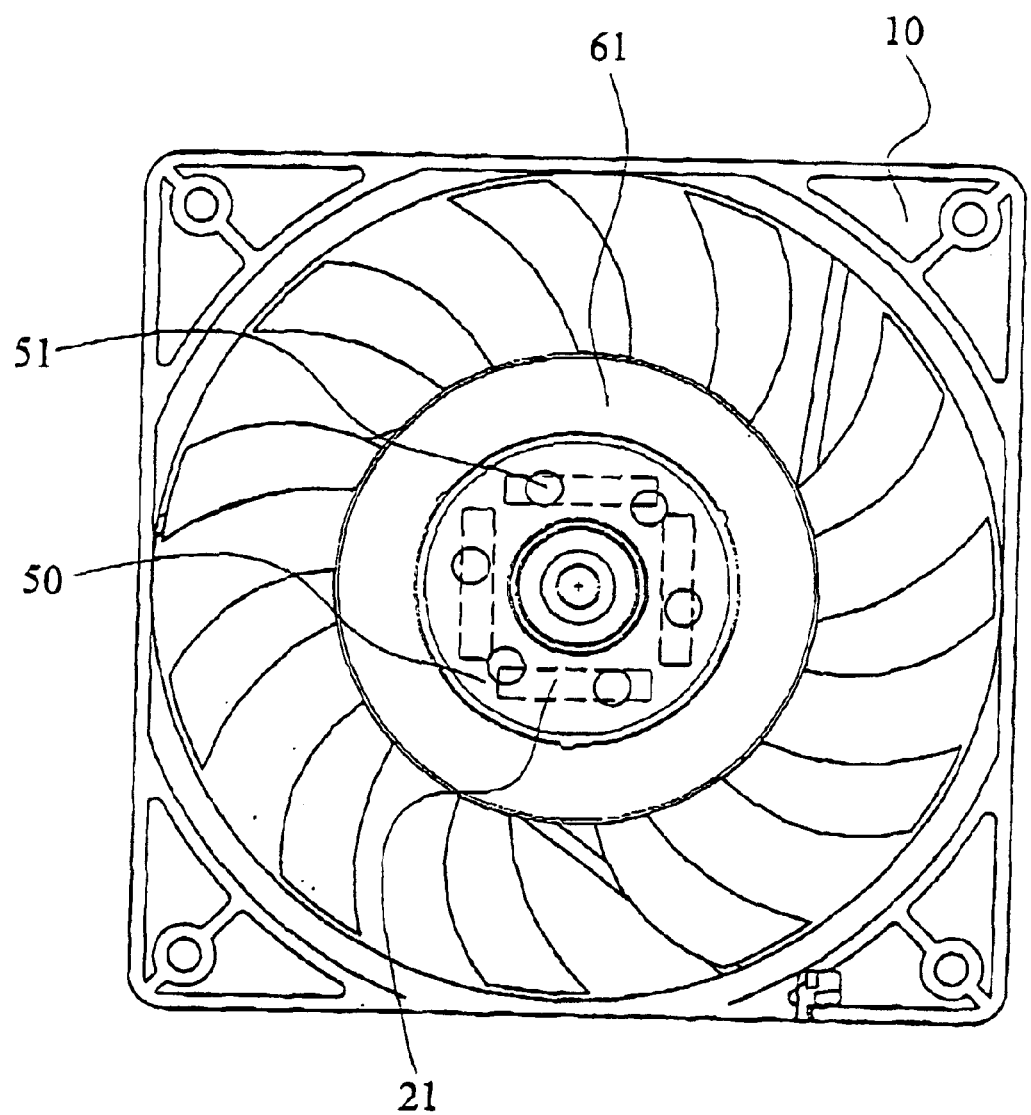
FIG. 1(c) is atop view of the conventional fan in FIG. 1(a)
Figures 2A, 2C:
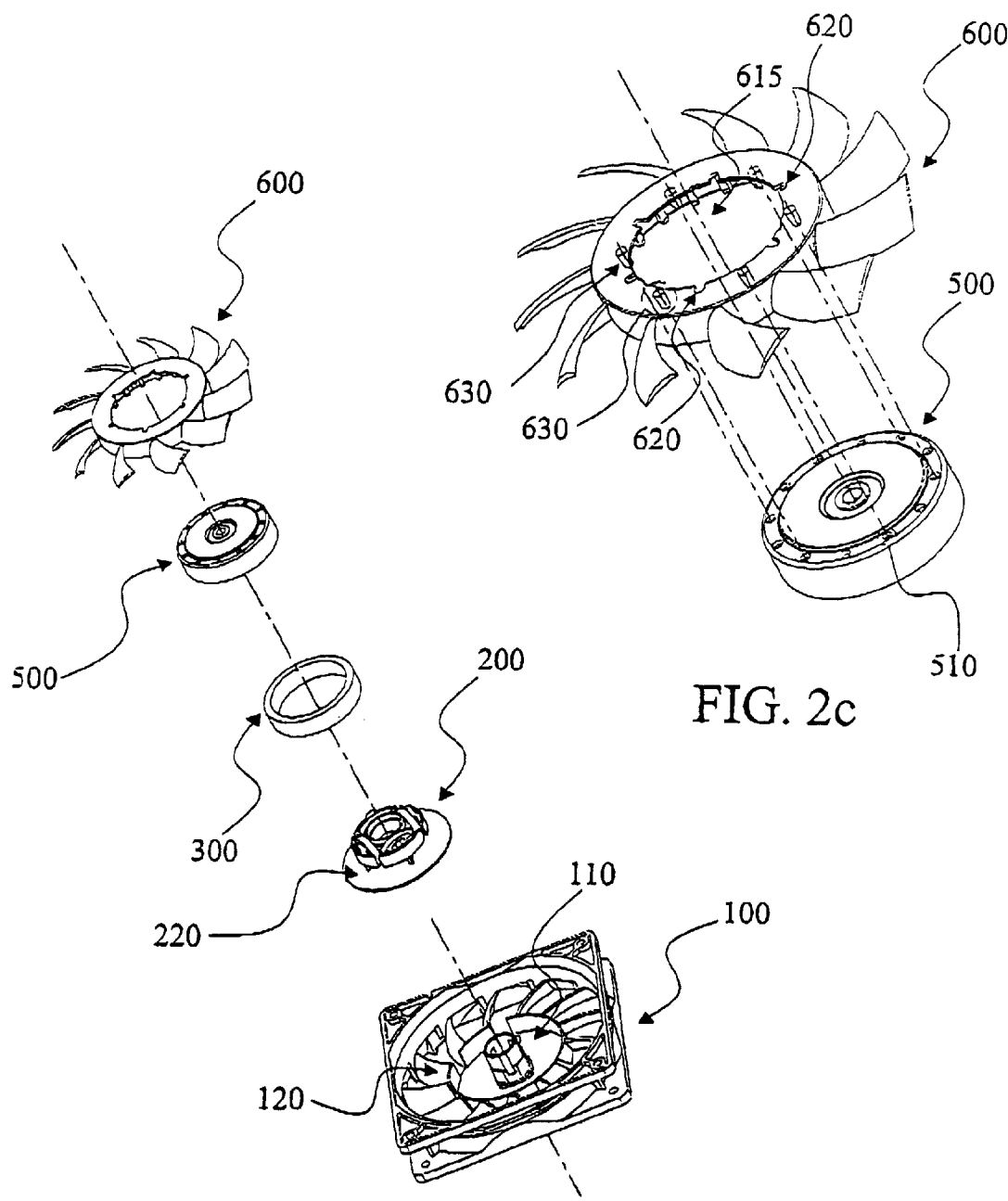
FIG. 2(a) is an exploded view of an embodiment of the fan of the present invention.
FIG. 2(c) is an enlarged view of the iron case 500 and the rotor blade impeller 600 in FIG. 2(a)
Figures 2B, 2D:
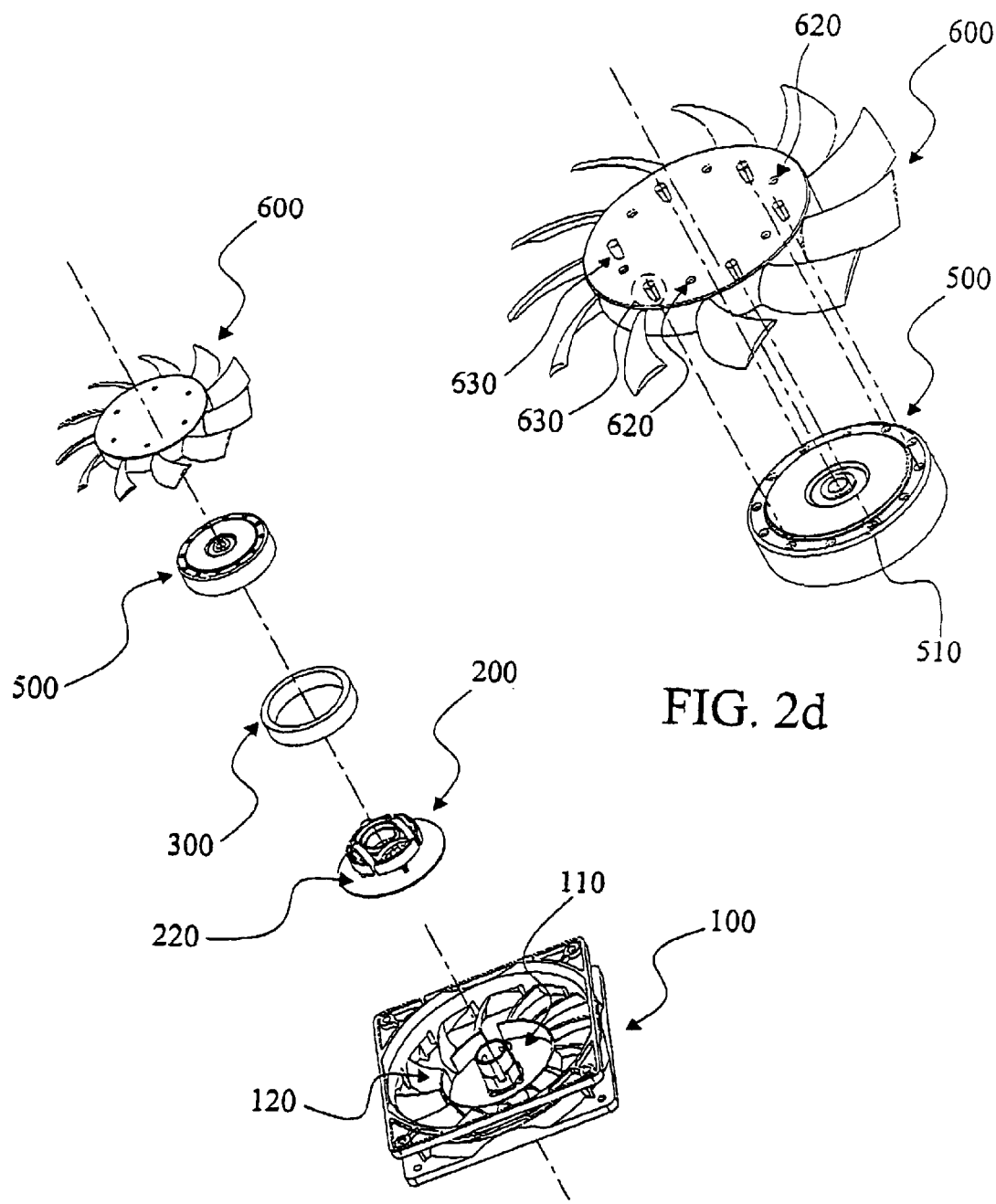
FIG. 2(b) is an exploded view of another embodiment of the fan of the present invention.
FIG. 2(d) is an enlarged view of the iron case 500 and the rotor blade impeller 600 in FIG. 2(b)
Figure 3B:
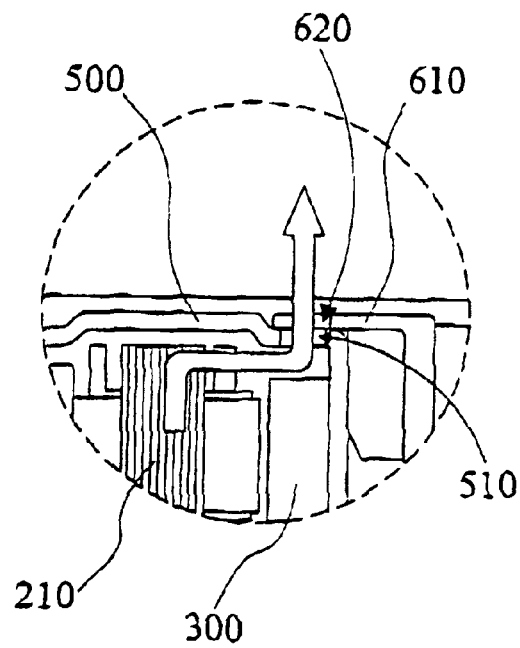
FIG. 3(b) is an enlarged view showing a portion of FIG. 3(a)
Figure 3A:
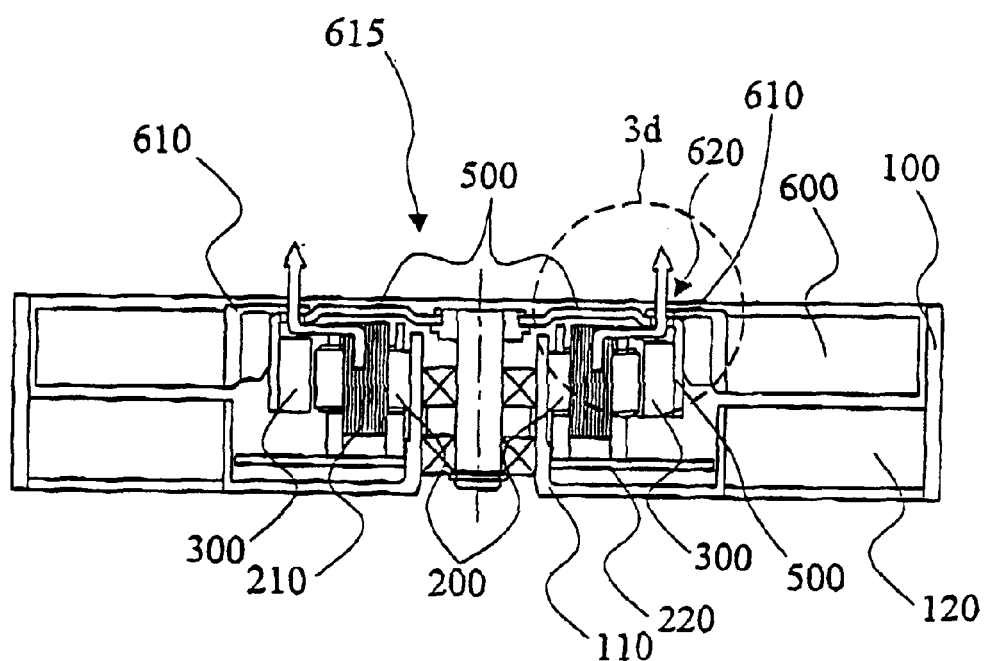
FIG. 3(a) is a cross-sectional view of the fan in FIG. 2(a)

Embodiments of the fan with improved self-cooling capability of the present invention are illustrated in FIG. 2(a), FIG. 2(b), FIG. 2(c), FIG. 2(d), FIG. 3(a) and FIG. 3(b), FIG. 2(a) and FIG. 2(b) shows exploded views of two embodiments of the fan of the present invention, and FIG. 3(a) is a cross-sectional view of the fan in FIG. 2(a). FIG. 2(c) and FIG. 2(d) are enlarged views of the iron case 500 and the rotor blade impeller 600 in FIG. 2(a) and FIG. 2(b), and FIG. 3(b) is an enlarged view showing a portion of FIG. 3(a). The fan of the present invention has a frame 100, a stator 200, a magnetic ring 300, an iron case 500 and a rotor blade impeller 600.

The frame 100 is provided with a base 110 and selectively formed with a plurality of guard blades 120 for increasing the blast pressure through the interaction between the rotor blades and the guard blades. The plurality of guard blades can have the shapes substantially similar to those of the rotor blades. Moreover, the guard blades are radially connected between the base and the outer frame for reinforcing the frame. The stator 200 is disposed on the base 110, and the stator 200 is provided with a plurality of coils 210, such as an axial coil shown in FIG. 3(a) or a radial coil (not shown), and other components, such as a circuit board 220 and electric components mounted on the circuit board 220, e.g. a driving IC and a Hall component (not shown). These components are well known to those skilled in the art and thus are not described hereinafter in detail.

The magnetic ring 300 is magnetically coupled to the stator 200. As shown in the embodiments, for example, the magnetic ring 200 is disposed substantially around the stator 300. The iron case 500 is coupled to the magnetic ring 200, in which the iron case 500 is formed in a cup-shape and provided with a shaft and at least a first heat dissipation hole 510. The first heat dissipation hole 510 is provided adjacent to an outer edge of the iron case 500.

The rotor blade impeller 600 is coupled to the iron case 500, and may be provided with, for example, at least an extrusion 630 extended downward on the hub of the rotor blade impeller 600 in order to couple to a part of the first heat dissipation hole 510 of the iron case 500 for position and engagement. In this case, it should be noted that the number of the first heat dissipation holes 510 must be greater than the number of the extrusions 630.

Further, the rotor blade impeller 600 can be formed with either an opening 615 on the hub and at least heat dissipation notch 620 aligned to the first heat dissipation hole 510 provided around the opening 615, as shown in FIG. 2(a), or at least a second heat dissipation hole 620 aligned to the first heat dissipation hole 510 on the hub 610, as shown in FIG. 2(b).

Figure 4:
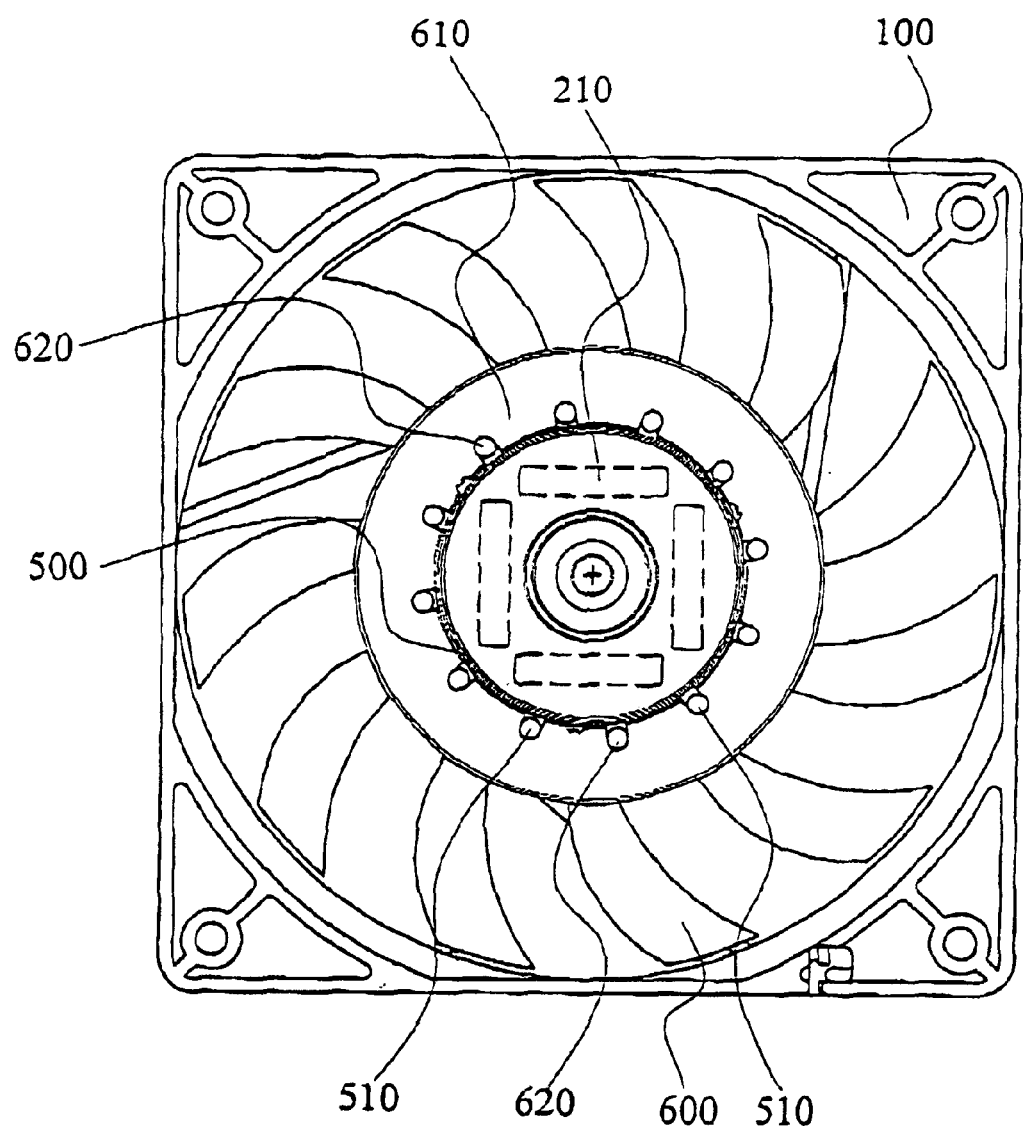
FIG. 4 is a top view of the fan in FIG. 2(a).

The embodiment shown in FIG. 2(a) and FIG. 2(c) can be further described with reference to the top view of the fan as shown in FIG. 4. It should be noted that the first heat dissipation hole 510 and the heat dissipation notch (or the second heat dissipation hole) 620 are not provided directly above the coils 210 (shown in dotted line in FIG. 4). For example, the first heat dissipation hole 510 and the second heat dissipation hole 620 can be formed above the magnetic ring 300; that is, the first heat dissipation hole 510 and the second heat dissipation hole 620 are not formed directly above the end of the coils 210. In this case, no part of the coils 210 is directly exposed or visible through the first heat dissipation hole 510 and the second heat dissipation hole 620 when viewed from the top of the fan assembly, so that foreign matter does not directly fall onto the coils 210 of the fan.

Further, the first heat dissipation hole 510 and the second heat dissipation hole 620 provide a heat exchange route to the outer environment; that is, air from outer environment may flow into the iron case 500 through the first heat dissipation hole 510 and the second heat dissipation hole 620. Thus, the first heat dissipation hole 510 and the second heat dissipation hole 620 provide for the desired self-cooling capability of the device by dissipating heat generated by the coils 210 and other internal components of the stator 200. Thus, heat generated by the coils 210 does not easily accumulate, and the fan of the present invention may be operated at a higher rotational speed and have a lengthened operation time.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fan assembly, comprising:
   a frame with a base;
   a stator disposed on the base, the stator being provided with at least a coil;
   a magnetic ring magnetically coupled to the stator;
   an iron case coupled to the magnetic ring, the iron case being provided with at least a first heat dissipation hole; and
   a rotor blade impeller coupled to the iron case, wherein at least a second heat dissipation hole aligned to the first heat dissipation hole is formed on a hub of the rotor blade impeller;
   wherein the first heat dissipation hole and the second heat dissipation hole are not formed to directly align to a position of the coil in an axial direction of the fan assembly.

2. The fan assembly according to claim 1, wherein the first heat dissipation hole and the second heat dissipation hole are formed above the magnetic ring.

3. The fan assembly according to claim 1, wherein the frame is provided with a plurality of guard blades.

4. The fan assembly according to claim 3, wherein the guard blades have shapes substantially similar to those of blades of the rotor blade impeller.

5. The fan assembly according to claim 4, wherein the stator comprises a driving IC and a Hall component.

6. The fan assembly according to claim 1, wherein the hub of the rotor blade impeller comprises at least an extrusion for coupling to a part of the first heat dissipation holes of the iron case.

7. The fan assembly according to claim 6, wherein the number of the first heat dissipation holes is greater than the number of the extrusions.

8. A fan assembly, comprising:
   a frame with a base;
   a stator disposed on the base, the stator being provided with at least a coil;
   a magnetic ring magnetically coupled to the stator;
   an iron case coupled to the magnetic ring, the iron case being provided with at least a first heat dissipation hole; and
   a rotor blade impeller coupled to the iron case, wherein an opening is formed on a hub of the rotor blade impeller, and at least a heat dissipation notch aligned to the first heat dissipation hole is provided around the opening;
   wherein the first heat dissipation hole and the heat dissipation notch are not formed to directly align to a position of the coil.

9. The fan assembly according to claim 8, wherein the first heat dissipation hole and the heat dissipation notch are formed above the magnetic ring.

10. The fan assembly according to claim 8, wherein the frame is provided with a plurality of guard blades.

11. The fan assembly according to claim 10, wherein the guard blades have shapes substantially similar to those of blades of the rotor blade impeller.

12. The fan assembly according to claim 11, wherein the stator comprises a driving IC and a Hall component.

13. The fan assembly according to claim 8, wherein the hub of the rotor blade impeller comprises at least an extrusion for coupling to the first heat dissipation holes of the iron case, and the number of the first heat dissipation holes is greater than the number of the extrusions.

14. The fan assembly according to claim 13, wherein the number of the first heat dissipation holes is greater than the number of the extrusions.

\* \* \* \* \*